(12) United States Patent
Maruyama et al.

(10) Patent No.: US 7,320,480 B2
(45) Date of Patent: Jan. 22, 2008

(54) STRUCTURE FOR FIXING STEERING-GEAR HOUSING

(75) Inventors: Tatsuyoshi Maruyama, Kanagawa (JP); Takahide Kaneko, Kanagawa (JP)

(73) Assignee: Unisia JKC Steering Systems, Co., Ltd., Kanagawa (JP)

( * ) Notice: Subject to any disclaimer, the term of this patent is extended or adjusted under 35 U.S.C. 154(b) by 13 days.

(21) Appl. No.: 10/807,349

(22) Filed: Mar. 24, 2004

(65) Prior Publication Data

US 2004/0188589 A1    Sep. 30, 2004

(30) Foreign Application Priority Data

Mar. 27, 2003 (JP) ............................. 2003-086748
Jul. 15, 2003 (JP) ............................. 2003-196913

(51) Int. Cl.
*B62D 1/16* (2006.01)
(52) U.S. Cl. .................................. 280/779; 248/230.6
(58) Field of Classification Search ................. 248/73, 248/220.21, 229.2, 229.25, 231.71, 230.6, 248/229.15; 280/779, 93.515, 775, 777; 24/282, 284
See application file for complete search history.

(56) References Cited

U.S. PATENT DOCUMENTS

| 1,485,922 | A | * | 3/1924 | Higgins ...................... 280/779 |
| 1,928,316 | A | * | 9/1933 | Muto .......................... 285/373 |
| 3,373,629 | A | * | 3/1968 | Wight et al. .................. 74/492 |
| 4,020,531 | A | * | 5/1977 | Ahrens et al. ................ 24/284 |
| 4,241,937 | A | * | 12/1980 | Eggen et al. ............... 280/777 |
| 4,314,710 | A | * | 2/1982 | Kamoshita et al. .... 280/93.515 |
| 5,035,383 | A | * | 7/1991 | Rainville ................... 248/68.1 |
| 5,152,358 | A | * | 10/1992 | Kozuka ....................... 180/78 |
| 5,251,932 | A | * | 10/1993 | Ide ............................. 280/784 |
| 5,613,709 | A | * | 3/1997 | Nakamichi ................. 280/777 |

FOREIGN PATENT DOCUMENTS

JP   1-244965 A   9/1989
JP   2001-171530 A   6/2001

* cited by examiner

*Primary Examiner*—A. Joseph Wujciak, III
(74) *Attorney, Agent, or Firm*—Foley & Lardner LLP (57) ABSTRACT

A fixing structure includes a first bracket having a first bolt hole, a second bracket having a second bolt hole smaller in the axial length than the first bolt hole, a securing member for securing a circumferential end of the first bracket and a circumferential end of the second bracket, and a securing bolt arranged from the second bolt hole through the first bolt hole and for securing the first bracket, the second bracket, and the vehicle-body member together.

17 Claims, 7 Drawing Sheets

STRUCTURE FOR FIXING STEERING-GEAR HOUSING

BACKGROUND OF THE INVENTION

The present invention relates to a structure for fixing a steering-gear housing to a vehicle-body member.

JP-A 1-244965 discloses a structure for fixing a steering-gear housing to a vehicle-body member by using a pair of brackets or two circumferentially divided portions of a bracket unit. With a resilient body held between the inner periphery of the brackets and the outer periphery of the steering-gear housing in the compressed state, the brackets are previously integrated together by welding or the like to form a bracket unit. The bracket unit is temporarily fixed to the steering-gear housing, then mounted to a vehicle-body member by two securing bolts. However, such fixing structure needs complicated assembling work such that two brackets are previously integrated together by welding or the like, which is then mounted to a vehicle-body member by securing bolts.

Then, in order to achieve simplified assembling work, in place of carrying out previous integration by welding or the like, two brackets can be integrated together by two securing bolt, and mounted to a vehicle-body member. JP-A 2001-171530 discloses a structure for fixing a steering-gear housing, which comprises two securing bolts for securing two brackets at circumferential ends, wherein one of the bolts serves as an auxiliary securing bolt for securing the two brackets only, and another serves as a main securing bolt for securing the two brackets and a vehicle-body member together, wherein the steering-gear housing is supported through an engaged portion of the brackets provided by the main securing bolt, providing so-called cantilever support.

With the structure disclosed in JP-A 2001-171530, if only the auxiliary securing bolt can previously be engaged to temporarily fix the brackets to the steering-gear housing, only engagement of the main securing bolt is needed during assembling of the brackets to the vehicle-body member, resulting in remarkably simplified assembling work. After completing assembling, a resilient body is held in the fully compressed state to ensure stable holding and fixing of the steering-gear housing. Thus, with only the auxiliary securing bolt engaged, the brackets are separated from each other at sites with main bolt holes for receiving the main securing bolts by, principally, a resiliency of the resilient body, resulting in difficult insertion of the main securing bolt into the main bolt holes of the brackets, and thus difficult engaging work of the main securing bolt.

When simply decreasing the length of the main bolt holes, insertion of the main securing bolt into the main bolt holes can be made easily, but the strength of the brackets at engaged portions for main securing bolt is difficult to secure. With the fixing structure of cantilever support ensured only by the engaged portions provided by the main securing bolt, particularly, it is important to secure the strength of the engaged portions of the brackets. On the other hand, when simply increasing the length of the main bolt holes, the strength of the engaged portions of the brackets can be enhanced, but inserting and engaging work of the main securing bolt becomes difficult.

With the structure disclosed in JP-A 2001-171530, since a collar is previously press fitted into the main bolt holes, separation of the sites of the brackets as described above cannot occur. However, the use of a collar leads to not only an increase in the number of parts, but also a necessity of press-fitting work.

SUMMARY OF THE INVENTION

It is, therefore, an object of the present invention to provide a structure for fixing a steering-gear housing to a vehicle-body member, which allows fully secured strength of brackets at engaged portions for a main securing bolt with simple structure, and remarkably simplified assembling work.

The present invention provides generally a structure for fixing a steering-gear housing to a vehicle-body member, which comprises: a first bracket comprising a first supporting face supporting one circumferential side face of the steering-gear housing, a first abutting face arranged at one circumferential end and abutting on the vehicle-body member, a first bolt hole arranged through the first abutting face, and a second abutting face arranged axially opposite to the first abutting face through the first bolt hole; a second bracket comprising a second supporting face supporting another circumferential side face of the steering-gear housing, a third abutting face arranged at one circumferential end and abutting on the second abutting face, and a second bolt hole arranged through the third abutting face at a position corresponding to the first bolt hole and being smaller in an axial length than the first bolt hole; a member which secures another circumferential end of the first bracket and another circumferential end of the second bracket; and a bolt arranged from the second bolt hole through the first bolt hole, the bolt securing the first bracket, the second bracket, and the vehicle-body member together.

BRIEF DESCRIPTION OF THE DRAWINGS

The other objects and features of the present invention will become apparent from the following description with reference to the accompanying drawings, wherein.

DETAILED DESCRIPTION OF THE INVENTION

Referring to the drawings, a description is made about a structure for fixing a steering-gear housing to a vehicle-body member embodying the present invention.

Figure 1:
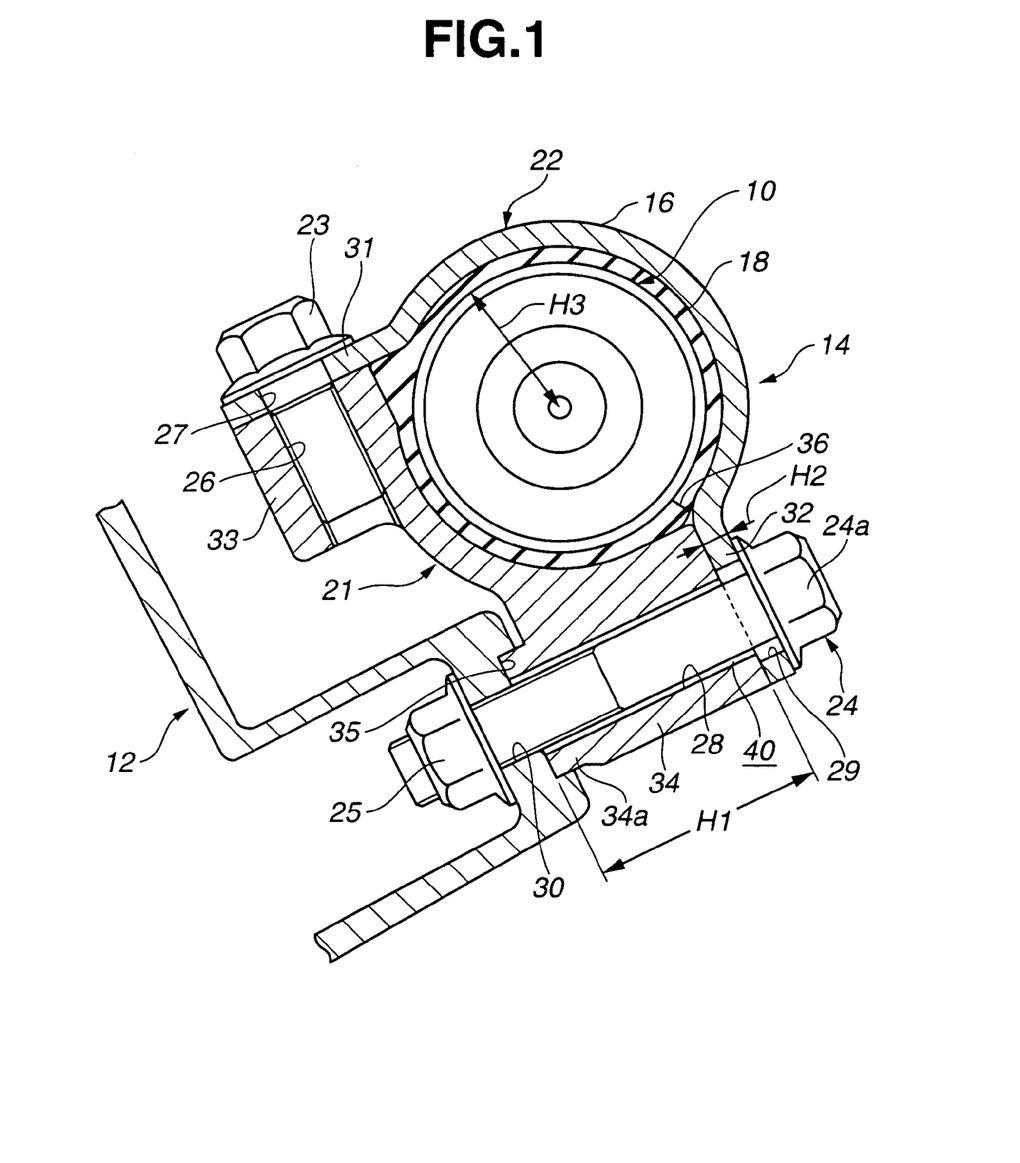
FIG. 1 is a sectional view showing a first embodiment of a structure for fixing a steering-gear housing to a vehicle-body member according to the present invention.

Referring to FIGS. 1-4C, there is shown first embodiment of the present invention. Referring to FIG. 1, the fixing structure comprises a steering-gear housing 10 for accommodating a steering gear, a suspension member or vehicle-body member 12 to which steering-gear housing 10 is mounted, and a bracket assembly 14 comprising a cylinder portion 16 mounted on the outer periphery of steering-gear housing 10 to surround same and a rubber resilient body 18, such as an insulator, interposed between the inner periphery of cylinder portion 16 and the outer periphery of steering-gear housing 10 in the compressed state to absorb and attenuate vibrations and the like.

Bracket assembly 14 comprises essentially first and second brackets 21, 22 obtained by circumferentially dividing cylinder portion 16 into two portions, an auxiliary securing bolt or member 23 for securing brackets 21, 22 at one circumferential end, and a main securing bolt or member 24 and nut 25 for securing brackets 21, 22 at another circumferential end and suspension member 12 together.

During engagement, auxiliary securing bolt 23 is engaged in a first auxiliary bolt hole 26 formed through first bracket 21 through a second auxiliary bolt hole 27 formed through second bracket 22. First auxiliary bolt hole 26 is formed with an internal thread meshed with an external thread of auxiliary securing bolt 23. On the other hand, during engagement, main securing bolt 24 is arranged through a second main bolt hole 29 formed through second bracket 22, a first main bolt hole 28 formed through first bracket 21, and a third main bolt hole 30 formed through suspension member 12 in this order. Nut 25 is engaged with an end of main securing bolt 24 protruding from the back of suspension member 12, then tightened to main securing bolt 24, obtaining brackets 21, 22 and suspension member 12 fixed between nut 25 and a bolt head 24a of main securing bolt 24.

Figure 4A:
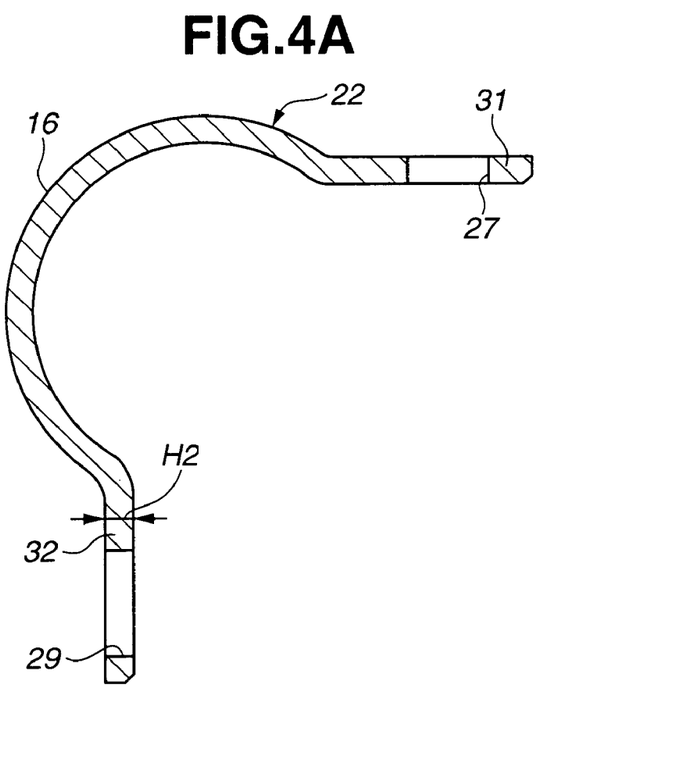
FIG. 4A is a view similar to FIG. 3A, showing a second bracket.
Figure 4B:
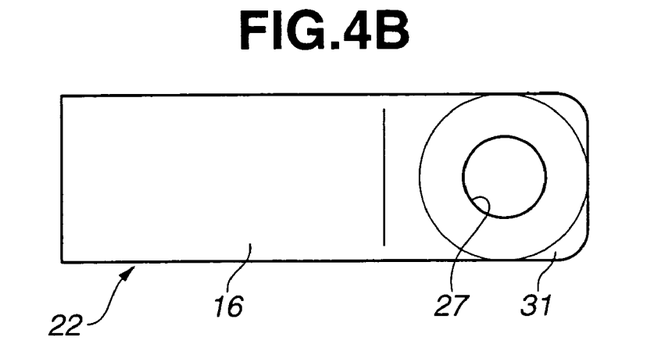
FIG. 4B is a view similar to FIG. 3B, showing the second bracket.
Figure 4C:
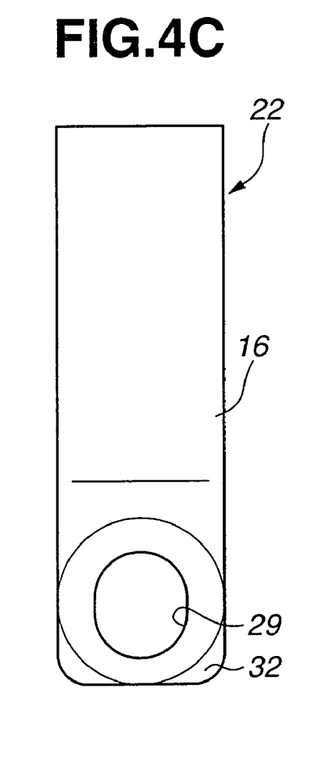
FIG. 4C is a view similar to FIG. 3C, showing the second bracket.

Referring to FIGS. 4A-4C, second bracket 22 is formed with most (roughly ¾) of cylinder portion 16, and includes sheet-like flanges 31, 32 obtained by bending circumferential ends of cylinder portion 16 radially outward. Bolt holes 27, 29 are formed in flanges 31, 32, respectively. Second bracket 22, including most of cylinder portion 16 and flanges 31, 32, is of a roughly uniform thickness H2. Therefore, second bracket 22 can be shaped easily inexpensively by press working. That is, since easily shapeable second bracket 22 constitutes most of cylinder portion 16, the size of first bracket 21 (press working of which is substantially impossible) can be reduced and restrained, resulting in a reduction in manufacturing cost and weight and the like.

Referring to FIGS. 3A-3D, first bracket 21 includes a portion which forms part (roughly ¼) of cylinder portion 16 and has both circumferential sides formed with bolt bosses 33, 34 having bolt holes 26, 28. Bolt bosses 33, 34 are of sufficiently large lengths in the bolt axial and radial directions to provide sufficient bolt tightening strength. By way of example, the bolt-axial-direction length is sufficiently larger than thickness H2 of first bracket 21. Particularly, referring also to FIG. 1, a bolt-axial-direction length H1 of main bolt boss 34 and first main bolt hole 28 is larger than length H2 of second main bolt hole 29 and a radius H3 of steering-gear housing 10. As being of a relatively complicated shape having thickened and massed bolt bosses 33, 34, first bracket 21 is nearly impossible to be shaped by press working, and thus is obtained by die-casting, extrusion, and the like.

Referring to FIG. 1, a recess 35 is formed at an outer edge of third main bolt hole 30 of suspension member 12 to engage with an end or protrusion 34a of main bolt boss 34 which forms an outer edge of first main bolt hole 28. Specifically, end 34a of main bolt boss 34 and recess 35 are coupled to each other in a socket-and-spigot way. In engagement of end 34a and recess 35, first main bolt hole 28 is disposed coaxial with second main bolt hole 29. This not only facilitates positioning of brackets 21, 22 with respect to suspension member 12 during an assembling process as will be described later, but also enhances a mounting rigidity of brackets 21, 22 with respect to suspension member 12 after completing assembling.

Figure 2:
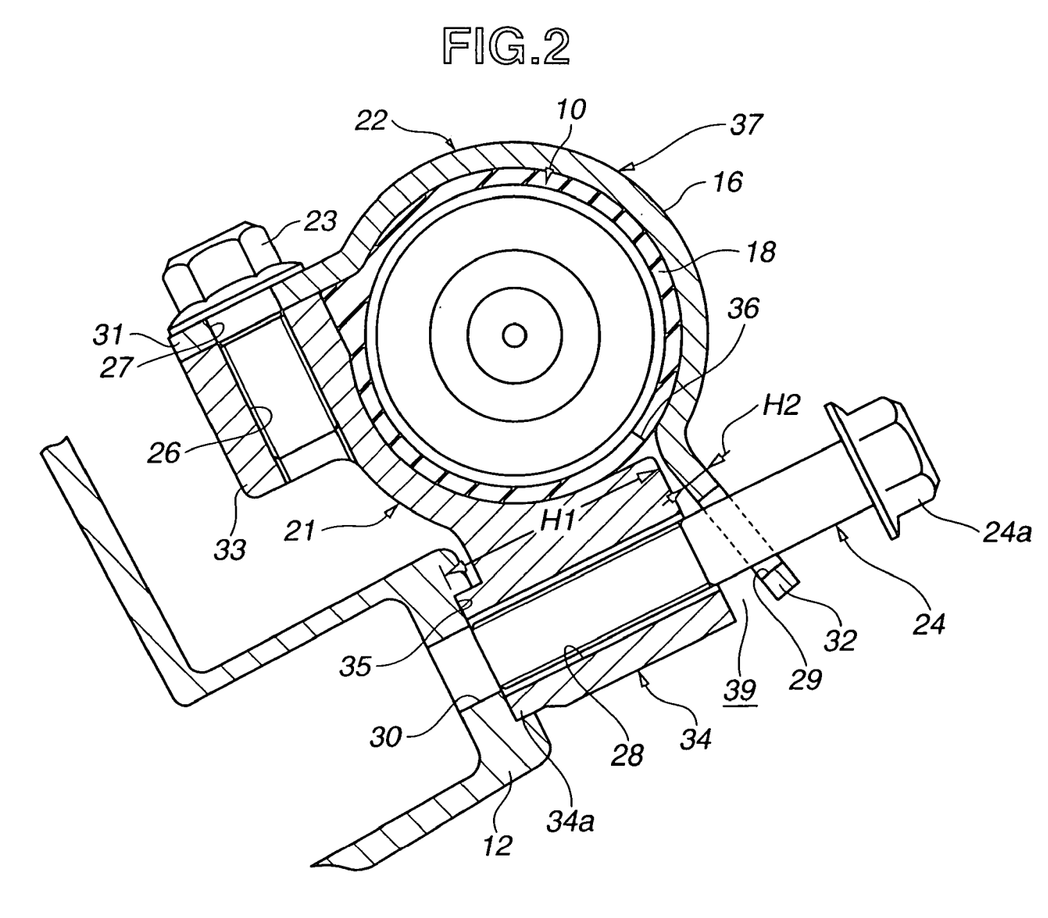
FIG. 2 is a view similar to FIG. 1, showing the first embodiment at an assembling process.
Figure 3A:
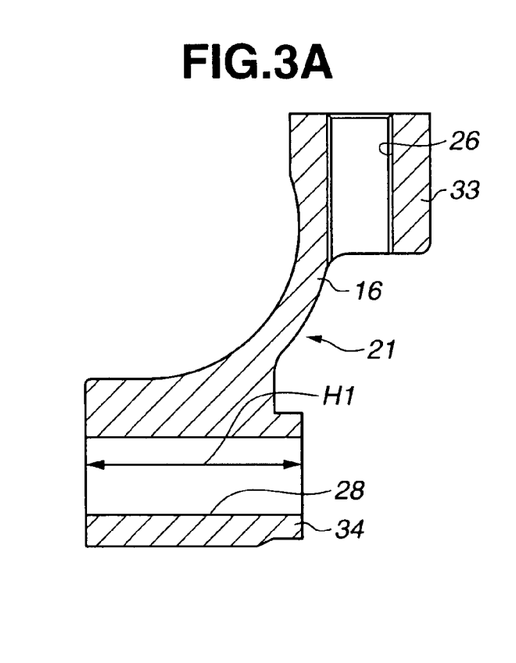
FIG. 3A is a front view showing a first bracket.
Figure 3B:
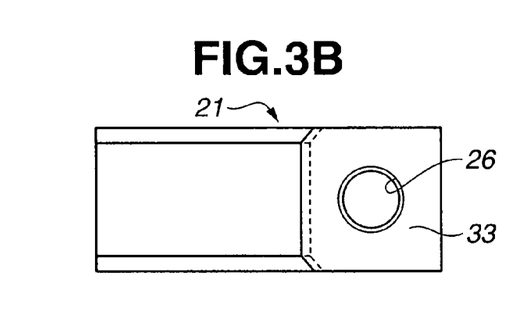
FIG. 3B is a top view showing the first bracket.
Figure 3C:
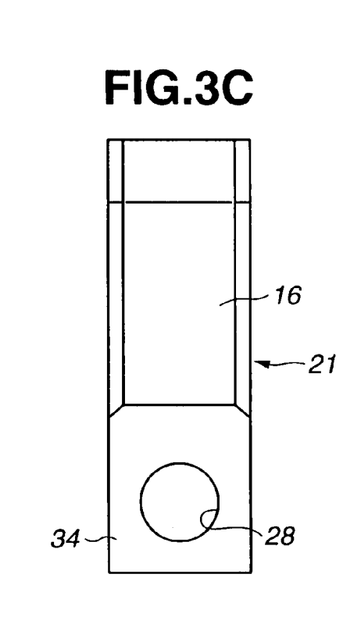
FIG. 3C is a left side view showing the first bracket.
Figure 3D:
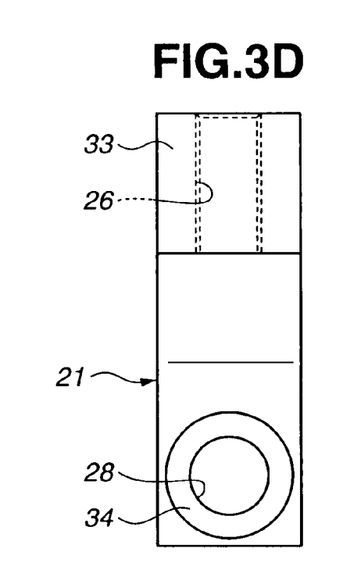
FIG. 3D is a right side view showing the first bracket.

Referring to FIG. 2, the assembling process is described. First, rubber resilient body or member 18 is opened at an incision 36, then mounted on the outer periphery of steering-gear housing 10 at a predetermined axial position. First and second brackets 21, 22 are arranged on the outer periphery of rubber resilient body 18, and are engaged with each other by auxiliary securing bolt 23. Thus, an intermediate assembly 37 comprising brackets 21, 22 and auxiliary securing bolt 23 is temporarily fixed to steering-gear housing 10 in a stable and secure way as shown in FIG. 2. Intermediate assembly 37 is previously provided to steering-gear housing 10 as a subassembly in such a way, contributing to a reduction in the number of parts at a stage before assembling to suspension member 12, leading to enhanced workability in transport, delivery, and the like. At the final assembling process where steering-gear housing 10 is assembled to suspension member 12, required work is only to engage end 34a of main bolt boss 34 in recess 35 of suspension member 12, and tighten main securing bolt 24 and nut 25, allowing remarkably simplified working process.

In the final state of bracket assembly 14, i.e. state after engaging main securing bolt 24, as shown in FIG. 1, rubber resilient body 18 is fully compressed to ensure stable holding of steering-gear housing 10. As a result, with intermediate assembly 37 having only auxiliary securing bolt 23 engaged as shown in FIG. 2, second bracket 22 is inevitably deformed in the expanding direction by, principally, a resiliency of rubber resilient body 18. Thus, main flange 32 having second main bolt hole 29 is separated from main bolt boss 34 in the circumferential direction, i.e. main flange 32 faces main bolt boss 34 across a sector-like clearance 39.

In order to ensure easy engagement of main securing bolt 24 in bolt holes 28-30 in such separated state, second main bolt hole 29 includes a slot which is longer in the direction orthogonal to the axial direction of steering-gear housing 10. Moreover, the length of second main bolt hole 29, i.e. thickness H2 of second bracket 22, is sufficiently smaller than length H1 of first main bolt hole 28. Therefore, in the state of intermediate assembly 37, main securing bolt 24 has an insertion locus completely situated inside second main bolt hole 29, having no interference with the edge of second main bolt hole 29. Thus, main securing bolt 24 can easily be inserted into first main bolt hole 28 through second main bolt hole 29 without any interference with the edge of second main bolt hole 29.

Specifically, since length H1 of first main bolt hole 28 is longer than length H2 of second main bolt hole 29, main bolt boss 34 forming a periphery of first main bolt hole 28 can be enlarged and thickened to provide an engaged portion for main securing bolt 24 having fully secured strength. Specifically, since first main bolt hole 28 is longer than second main bolt hole 29, the strength and rigidity of the engaged portion for main securing bolt 24 can be secured in excellent compatibility with enhancement in assembling workability.

If length H2 of second main bolt hole 29 is set to be larger than or equal to length H1 of first main bolt hole 28, a reduction occurs in the strength of main securing bolt 24 or the insertion workability for main securing bolt 24.

Considering the bolt insertion-ability, a predetermined clearance 40 is defined between the inner periphery of first main bolt hole 28 and the outer periphery of main securing bolt 24. Due to presence of clearance 40, first bracket 21 may rock with respect to main securing bolt 24. In the first embodiment, however, since length H1 of first main bolt hole 28 is sufficiently larger, e.g. than radius H3 of steering-gear housing 10, rocking of first bracket 21 can be reduced or cancelled sufficiently.

In the first embodiment, since the fixing structure is of so-called cantilever support wherein steering-gear housing 10 is supported only by an engaged portion of main bolt boss 34, the mounting position of steering-gear housing 10 with respect to suspension member 12 can be changed/adjusted easily. Specifically, by changing bolt-axial-direction length H1 and bolt-radial-direction length of main bolt boss 34, the mounting position of steering-gear housing 10 can be changed/adjusted without any modification of second bracket 22. This allows easy application of the fixing structure to steering-gear housing 10 having different mounting position by replacing, e.g. first bracket 21 only.

Figure 5:
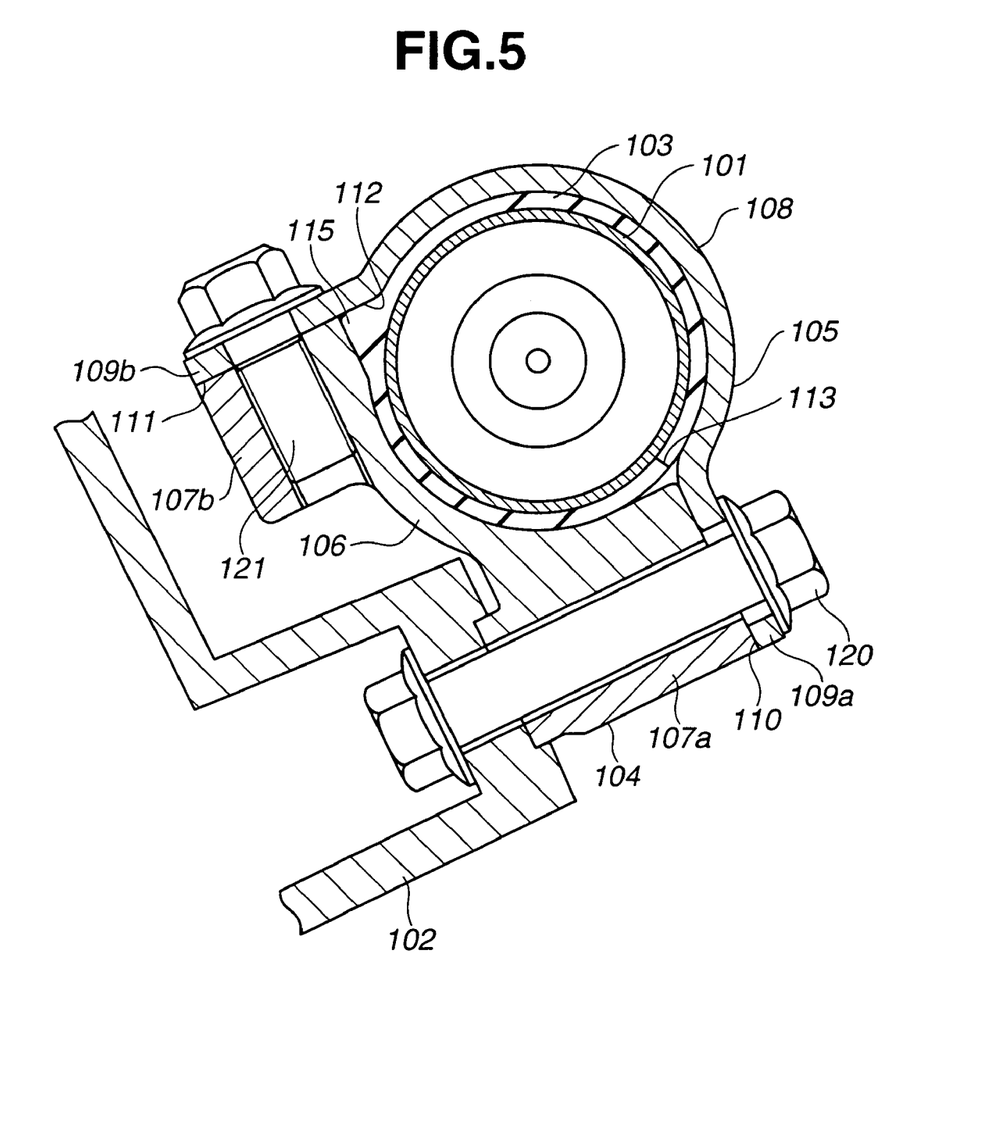
FIG. 5 is a view similar to FIG. 2, showing a second embodiment of the present invention.

Referring to FIGS. 5-8, there is shown second embodiment of the present invention. Referring to FIG. 5, the fixing structure comprises a cylindrical member or steering-gear housing 101 mounted to a support member or suspension member 102. Cylindrical member 101 is held by a pair of brackets 104, 105 through a rubber resilient body 103. First ends of brackets 104, 105 are connected to support member 102.

First bracket 104 is formed like a relatively thick mass by casting, and includes a roughly 90° curved holder 106 and flanges 107a, 107b arranged on both sides of holder 106 to protrude radially outward.

Second bracket 105 is formed like a relatively thin mass by press working, and includes a roughly 270° curved holder 108 and flanges 109a, 109b arranged on both sides of holder 108 to protrude radially outward. With flanges 107a, 107b butting on corresponding flanges 109a, 109b so that holders 106, 108 form a circle, brackets 104, 105 are coupled together by securing bolts 120, 121. Flanges 107a, 109a of a pair arranged at the first ends of brackets 104, 105 are not only coupled to each other, but also mounted to support member 102.

Figure 8:
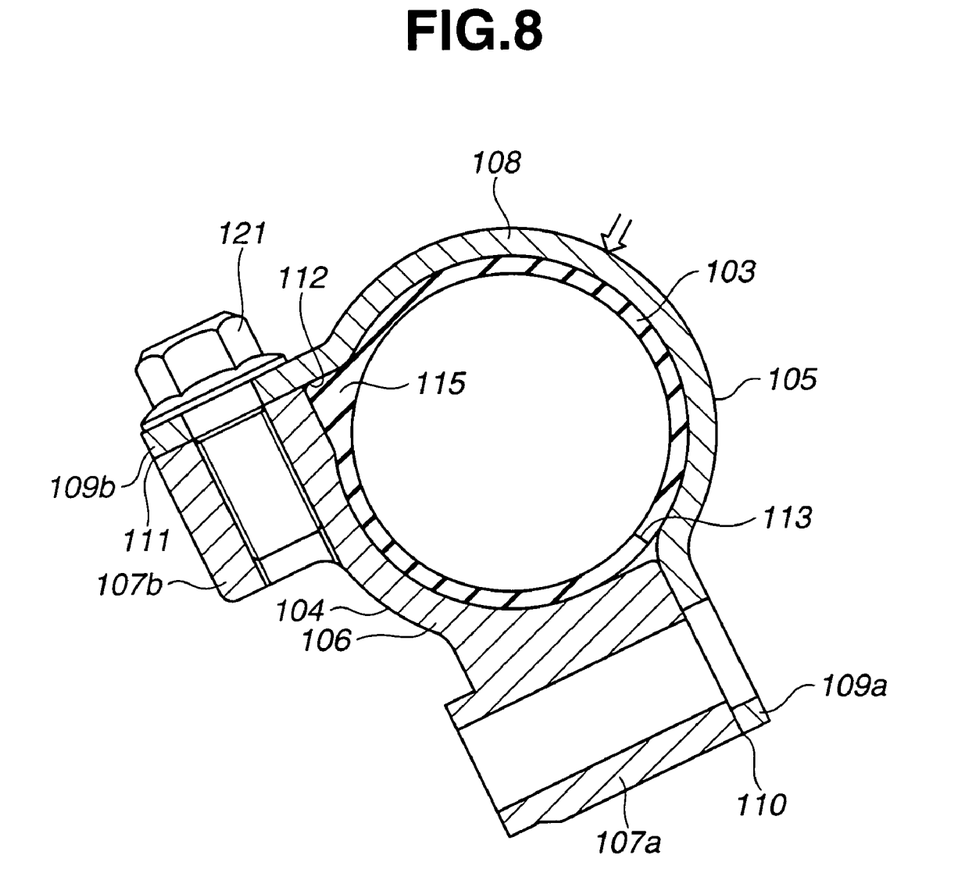
FIG. 8 is a view similar to FIG. 5, showing the second embodiment at an assembling process

Referring to FIGS. 5 and 8, first ends of holders 106, 108 of brackets 104, 105 on the side of a mating face 110 of flanges 107a, 109a have inner circular surfaces connected continuously. Second ends of holders 106, 108 on the side of a mating face 111 of flanges 107b, 109b have inner circular surfaces extending flatwise roughly along the tangential directions and butting on each other to form roughly a right angle. Therefore, the inner peripheral surfaces of holders 106, 108 of brackets 104, 105 are shaped circularly as a whole, while having a single concave 112 provided at a portion connected continuously to flanges 107b, 109b to hollow in a substantially right-angled way.

Figure 6:
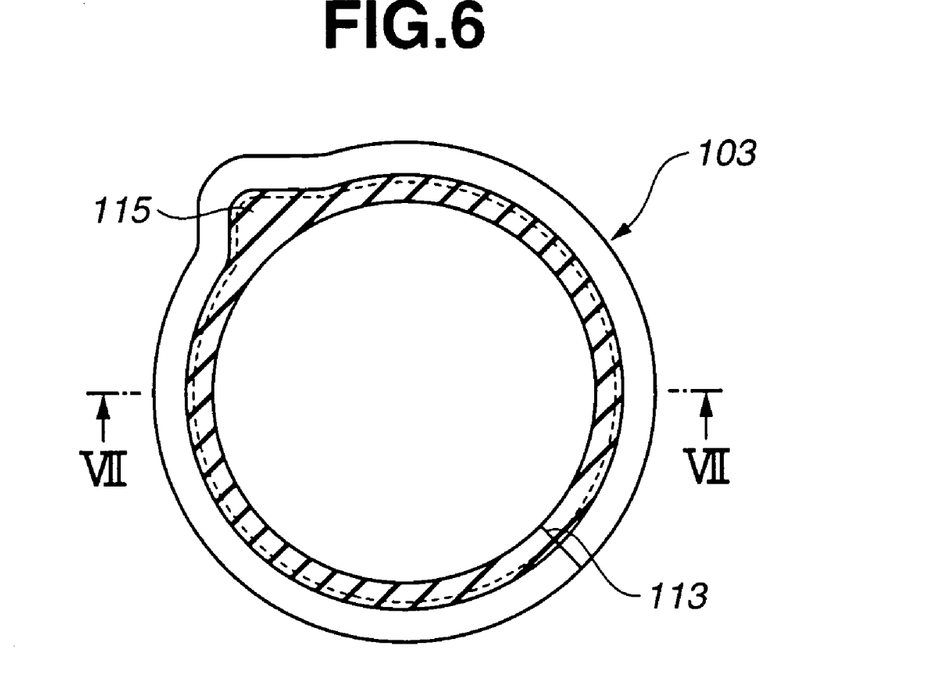
FIG. 6 is a cross sectional view, taken along the line VI-VI in FIG. 7.
Figure 7:
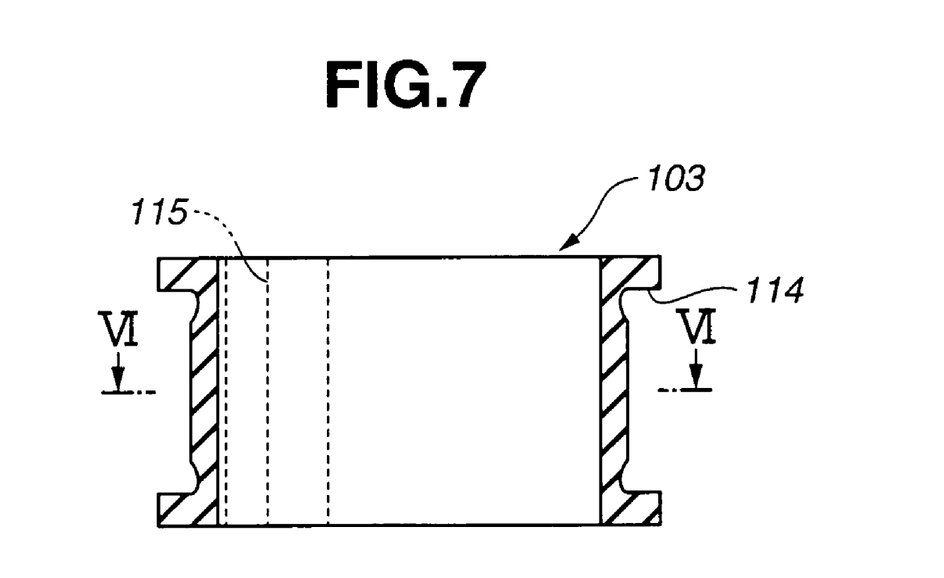
FIG. 7 is a longitudinal sectional view, taken along the line VII-VII in FIG. 6.

Referring to FIGS. 6 and 7, rubber resilient body 103 is shaped like a cylinder, as a whole, corresponding roughly to the outer peripheral surface of cylindrical member 101, and has an incision 113 provided axially through the peripheral wall. When mounting rubber resilient body 103 on the outer periphery of cylindrical member 101, rubber resilient body 103 is opened at incision 113. A wide groove 114 is formed in the outer peripheral surface of rubber resilient body 103 to engage with holders 106, 108 of brackets 104, 105. With the axial end faces of holders 106, 108 abutting on the side walls of groove 114, rubber resilient body 103 is axially secured with respect to brackets 104, 105 in a unloose way.

A protrusion 115 having triangular section and protruding radially outward is axially formed on the outer peripheral surface of rubber resilient body 103 at the position a predetermined circumferential distance away from incision 113. The distance between protrusion 115 and incision 113 is equal to the distance between concave 112 defined by brackets 104, 105 and mating face 110 of flanges 107a, 109a. Corresponding to the shape of concave 112, protrusion 115 has an apex angle substantially equal to a right angle.

When mounting cylindrical member 101 to support member 102, rubber resilient body 103 is opened at incision 113, then mounted on the outer peripheral surface of cylindrical member 101. A portion of cylindrical member 101 covered with rubber resilient body 103 is disposed on holder 106 of first bracket 104. With protrusion 115 of rubber resilient body 103 abutting on the flat portion of holder 106 of first bracket 104 at the second end thereof, groove 114 of rubber resilient body 103 and holder 106 of first bracket 104 are engaged with each other (see FIG. 7).

Next, referring to FIG. 8, second bracket 105 is mounted on cylindrical member 101 from the direction of arrow, and holder 108 of second bracket 105 is engaged in groove 114 of rubber resilient body 103. Then, the flat portion of holder 106 of first bracket 104 at the second end thereof abuts on protrusion 115 of rubber resilient body 103, obtaining protrusion 115 engaged in concave 112 of brackets 104, 105. Flanges 107b, 109b of brackets 104, 105 at the second ends thereof are coupled together by securing bolt 121, thereby fixing cylindrical member 101 to brackets 104, 105.

Subsequently, securing bolt 120 is inserted through flanges 107a, 109a of brackets 104, 105 at the first ends thereof to fix flanges 107a, 109a and support member 102 together.

When carrying out bolt-coupling of brackets 104, 105, protrusion 115 of rubber resilient body 103 is engaged in concave 112 of brackets 104, 105 as described above. In this engaged state, incision 113 of rubber resilient body 103 positionally corresponds to mating face 110 of flanges 107a, 109a of brackets 104, 105 at the first ends thereof. Thus, bolt-coupling does not cause crush of incision 113 of rubber resilient body 103 in the open direction.

In the second embodiment, therefore, incision 113 of rubber resilient body 103 is not crushed locally during coupling of brackets 104, 105 as described above, resulting in no occurrence of inconveniences such as reduction in the durability of rubber resilient body 103 and variation in the spring characteristic.

Moreover, concave 112 of brackets 104, 105 may be formed at other portion of holders 106, 108 than the end thereof. In the second embodiment, concave 112 is provided at the position of holders 106, 108 facing mating face 111 of flanges 107b, 109b of brackets 104, 105, having the advantage of facilitating formation of concave 112 with respect to brackets 104, 105. Specifically, concave 112 can be obtained by simply extending edges of the inner peripheral surfaces of holders 106, 108 in the tangential directions so as to expand a circular arc, resulting in facilitated formation of concave 112 when forming brackets 104, 105 by either casting or press working. Moreover, the edge angle is smaller at an intersection of the inner peripheral surfaces of holders 106, 108 at mating face 111. Thus, when brackets 104, 105 are formed by casting, holders 106, 108 have an edge portion chipped difficultly, whereas when formed by press working, they can bent easily.

As described above, according to the present invention, the first and second brackets can temporarily be fixed to the outer periphery of the steering-gear housing and resilient body by the auxiliary securing member, resulting in a reduction in the number of parts during transfer, delivery, and the like. However, if the first and second brackets are temporarily fixed to the steering-gear housing by the auxiliary securing member only, an edge of the second bolt hole of the second bracket is deformed circumferentially away from an edge of the first bolt hole of the first bracket, principally, by a resiliency of the resilient body. Thus, the edges of the first and second bolt holes are separated from each other, resulting in a tendency of difficult insertion of the securing bolt into the first and second bolt holes.

According to the present invention, due to the second bolt hole being relatively small in length, the securing bolt can easily be inserted into the second bolt hole, whereas due to the first bolt hole being relatively large in length, the strength of an engaged portion for the securing bolt can be secured sufficiently. That is, the insertion workability of the securing bolt can be secured in effective compatibility with achievement of the strength of the engaged portion for the securing bolt.

Moreover, since the fixing structure is of so-called cantilever support wherein the steering-gear housing is fixed to the vehicle-body member by the engaged portion for the securing bolt only, the mounting position of the steering-gear housing with respect to the vehicle-body member can be changed/adjusted easily. Specifically, the mounting position of the steering-gear housing can be changed/adjusted by replacing/changing the first bracket only.

Further, according to the present invention, even if a clearance exists between the first bolt hole and the securing bolt, the first bracket may not rock with respect to the securing bolt since the axial length of the first bolt hole is secured sufficiently.

Still further, according to the present invention, even if the brackets are separated from each other at sites with bolt holes, the securing bolt can easily be inserted into the first bolt hole without interfering with the edge of the first bolt hole, resulting in a further enhancement in insertion workability of the securing bolt.

Furthermore, according to the present invention, the first bracket can easily be positioned with respect to the vehicle-body member during an assembling process, resulting in an enhancement in both assembling workability and mounting rigidity of the first bracket with respect to the vehicle-body member after completing assembling.

Further, according to the present invention, a resilient effect of the second bracket contributes to an enhancement in hold-ability for the steering-gear housing.

Still further, according to the present invention, shock resulting from the road surface can be absorbed by the resilient member.

Still further, according to the present invention, the resilient member is prevented from rotating during assembling, leading to enhanced assembling workability.

Furthermore, according to the present invention, the concave can be arranged without providing a particular concave form.

Further, according to the present invention, the resilient member can be mounted on the steering-gear housing in a winding way, leading to enhanced mount-ability, Still further, according to the present invention, the resilient member may not be deformed or wrinkled at the connection when engaging the connection by the securing bolt.

Having described the present invention in connection with the illustrative embodiments, it is noted that the present invention is not limited thereto, and various changes and modifications can be made without departing from the scope of the present invention.

By way of example, second bracket 22 can be obtained by casting in place of press working. Moreover, second bracket 22 can be formed out of a resilient material to eliminate resilient body 18.

Further, cylindrical member 101 may include other part than the steering-gear housing. Moreover, brackets 104, 105 may be both obtained by casting.

The entire teachings of Japanese Patent Application P2003-196913 filed Jul. 15, 2003 and Japanese Patent Application P2003-86748 filed Mar. 27, 2003 are hereby incorporated by reference.

What is claimed is:

1. A structure for fixing a steering-gear housing to a vehicle-body member, comprising:
   the vehicle-body member;
   the steering-gear housing;
   a first bracket comprising:
      a first supporting face that is configured to support one circumferential side face of the steering-gear housing,
      a first abutting face that is arranged at one circumferential end of the first bracket and that is configured to abut the vehicle-body member,
      a first bolt hole arranged through the first abutting face, and
      a second abutting face arranged axially opposite to the first abutting face through the first bolt hole;
   a second bracket comprising:
      a second supporting face that is configured to support another circumferential side face of the steering-gear housing,
      a third abutting face that is arranged at one circumferential end of the second bracket and that abuts the second abutting face, and
      a second bolt hole that is arranged through the third abutting face at a position corresponding to the first bolt hole and that is smaller in an axial length than the first bolt hole;
   a member that secures another circumferential end of the first bracket and another circumferential end of the second bracket; and
   a bolt that is arranged from the second bolt hole through the first bolt hole and that is configured to be inserted through a third bolt hole formed in the vehicle-body member to clamp together the first bracket, the second bracket, and the vehicle-body member,
   wherein the first bracket comprises a protrusion that is arranged at an edge of the first abutting face and that is configured to be engaged in a recess formed in the vehicle-body member.

2. The structure as claimed in claim 1, wherein the first bolt hole of the first bracket has an axial length larger than a radius of the steering-gear housing.

3. The structure as claimed in claim 1, wherein the second bolt hole of the second bracket comprises a slot which is longer in a direction substantially orthogonal to an axial direction of the steering-gear housing.

4. The structure as claimed in claim 1, wherein the second bracket is formed out of a sheet resilient material.

5. The structure as claimed in claim 1, further comprising a cylindrical resilient member that is configured to be arranged between the first and second brackets and the steering-gear housing.

6. A structure for fixing a steering-gear housing to a vehicle body member;
a first bracket comprising:
a first supporting face that is configured to support one circumferential side face of a steering-gear housing,
a first abutting face that is arranged at one circumferential end of the first bracket and that is configured to abut a vehicle-body member,
a first bolt hole arranged through the first abutting face, and
a second abutting face arranged axially opposite to the first abutting face through the first bolt hole;
a second bracket comprising:
a second supporting face that is configured to support another circumferential side face of the steering-gear housing,
a third abutting face that is arranged at one circumferential end of the second bracket and that abuts the second abutting face, and
a second bolt hole that is arranged through the third abutting face at a position corresponding to the first bolt hole and that is smaller in an axial length than the first bolt hole; and
a member, which secures another circumferential end of the first bracket and another circumferential end of the second bracket and which is not configured to be secured to the vehicle-body member;
a bolt that is arranged from the second bolt hole through the first bolt hole, and that is configured to secure the first bracket, the second bracket and the vehicle-body member together; and
a cylindrical resilient member that is configured to be arranged between the first and second brackets and the steering-gear housing;
wherein the resilient member is formed with a protrusion on an outer periphery, and
wherein the first and second supporting faces together create a concave engaged with the protrusion.

7. The structure as claimed in claim 6, wherein the concave of one supporting face is arranged at a connection between the first and second brackets.

8. A structure for fixing a steering-gear housing to a vehicle-body member, comprising:
the vehicle-body member;
the steering-gear housing;
a first bracket comprising:
a first supporting face that is configured to support one circumferential side face of the steering-gear housing,
a first abutting face that is arranged at one circumferential end of the first bracket and that is configured to abut the vehicle-body member,
a first bolt hole arranged through the first abutting face, and
a second abutting face arranged axially opposite to the first abutting face through the first bolt hole;
a second bracket comprising:
a second supporting face that is configured to support another circumferential side face of the steering-gear housing,
a third abutting face that is arranged at one circumferential end of the second bracket and that abuts the second abutting face, and
a second bolt hole that is arranged through the third abutting face at a position corresponding to the first bolt hole and that is smaller in an axial length than the first bolt hole;
a member, which secures another circumferential end of the first bracket and another circumferential end of the second bracket and which is not configured to be secured to the vehicle-body member; and
a bolt that is arranged from the second bolt hole through the first bolt hole and that is configured to secure the first bracket, the second bracket, and the vehicle-body member together.

9. The structure as claimed in claim 8, wherein the first bolt hole of the first bracket has an axial length larger than a radius of the steering-gear housing.

10. The structure as claimed in claim 8, wherein the second bolt hole of the second bracket comprises a slot which is longer in a direction substantially orthogonal to an axial direction of the steering-gear housing.

11. The structure as claimed in claim 8, wherein the second bracket is formed out of a sheet resilient material.

12. The structure as claimed in claim 8, further comprising a cylindrical resilient member that is configured to be arranged between the first and second brackets and the steering-gear housing.

13. The structure as claimed in claim 12, wherein the resilient member is formed with an incision.

14. A structure for fixing a steering-gear housing to a vehicle-body member, comprising:
a first bracket comprising:
a first supporting face that is configured to support one circumferential side face of the steering-gear housing,
a first abutting face that is arranged at one circumferential end of the first bracket and that is configured to abut the vehicle-body member,
a first bolt hole arranged through the first abutting face, and
a second abutting face arranged axially opposite to the first abutting face through the first bolt hole;
a second bracket comprising:
a second supporting face that is configured to support another circumferential side face of the steering-gear housing,
a third abutting face that is arranged at one circumferential end of the second bracket and that abuts the second abutting face, and
a second bolt hole that is arranged through the third abutting face at a position corresponding to the first bolt hole and that is smaller in an axial length than the first bolt hole;
means for securing another circumferential end of the first bracket and another circumferential end of the second bracket;
means, arranged from the second bolt hole through the first bolt hole and configured to extend through a third bolt hole formed in the vehicle-body member to clamp together the first bracket, the second bracket, and the vehicle-body member; and
a cylindrical resilient member that is configured to be arranged between the first and second brackets and the steering-gear housing,
wherein the resilient member is formed with a protrusion on an outer periphery, and
wherein the first and second supporting faces together create a concave engaged with the protrusion.

15. The structure as claimed in claim 14, wherein the concave of one supporting face is arranged at a connection between the first and second brackets.

16. The structure as claimed in claim 14, wherein the resilient member is formed with an incision.

17. The structure as claimed in claim 16, wherein the incision of the resilient member is arranged at a connection between the first and second brackets.

* * * * *